(12) United States Patent
De Brito (10) Patent No.: US 6,529,735 B1
(45) Date of Patent: Mar. 4, 2003

(54) METHOD AND ARRANGEMENT IN A COMMUNICATION NETWORK

(75) Inventor: Sandra De Brito, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/581,677

(22) PCT Filed: Nov. 20, 1998

(86) PCT No.: PCT/SE98/02106
§ 371 (c)(1),
(2), (4) Date: Sep. 15, 2000

(87) PCT Pub. No.: WO99/33199
PCT Pub. Date: Jul. 1, 1999

(30) Foreign Application Priority Data

Dec. 19, 1997 (SE) ................................. 9704764

(51) Int. Cl.⁷ .............................. H04Q 7/20; H04B 1/04
(52) U.S. Cl. .................... 455/456; 455/414; 455/458
(58) Field of Search ................................. 455/456, 428, 455/432, 435, 436, 3.04, 410, 429, 445, 446, 518, 519, 458, 467, 414

(56) References Cited

U.S. PATENT DOCUMENTS

| 5,235,633 A | 8/1993 | Dennison et al. |
| 5,425,028 A | 6/1995 | Britton et al. |
| 5,530,963 A | 6/1996 | Moore et al. |
| 5,533,107 A | 7/1996 | Irwin et al. |
| 5,654,959 A | 8/1997 | Baker et al. |

FOREIGN PATENT DOCUMENTS

| FR | 2703200 | 3/1993 |
| WO | WO 92/10069 | 6/1992 |
| WO | WO 95/95001 | 12/1995 |
| WO | WO 96/27997 | 9/1996 |
| WO | WO 96/31073 | 10/1996 |
| WO | WO 96/31992 | 10/1996 |
| WO | WO 97/16934 | 5/1997 |

OTHER PUBLICATIONS

GSM 04.22 "Digital Cellular Telecommunications System (Phase 2+); Radio Link Protocol (RLP) for data and telematic services on the Mobile Station–Base Station System (MS–BSS) interface and the Base Station System–Mobile–services Switching Centre", Dec. 1995.
TIA/EOA SP–3588 "Voice Feature Scenarios" Jun. 25, 1995, pp. 315–319 and 141–146.

Primary Examiner—Edward F. Urban
Assistant Examiner—Sheila Smith (57) ABSTRACT

The present invention is related to a communication service implemented in a communication network. The communication network receives (201) a request for communication between an originating party and a terminating party. The terminating party address specified in the request corresponds to a common group address to which a group of mobile communication units is associated. The geographical positions of the originating party and at least a subset of the mobile communication units in said group are determined (202, 203). Based on the determined geographical positions, one of the mobile communication units in said group is selected (204a). Typically the mobile communication unit that is determined as being closest to the originating party is selected. Communication is established (205) between the originating party and the selected mobile communication unit.

8 Claims, 7 Drawing Sheets

METHOD AND ARRANGEMENT IN A COMMUNICATION NETWORK

TECHNICAL FIELD OF THE INVENTION

The present invention relates to a communication service implemented in a communication network. More specifically, the invention relates to a method of performing a communication service for establishing communication between an originating party and a terminating party, where the terminating party is selected in dependence of the geographical positions of the originating party and a set of mobile communication units. The invention includes a communication network in which the communication service is implemented.

DESCRIPTION OF RELATED ART

There are a number of different services, e.g. taxi or package delivery, which can be labelled as geographically dependent services. In these services, a party requesting the service typically makes a call to a service provider switchboard and states the exact location where the service is required. The switchboard staff will then select, from a group of available executing service providers e.g. taxi drivers, the executing service provider closest to the requesting party and give him an order to go to the location of the requesting party and perform the service. Geographically dependent services could be provided in a more efficient manner if the requesting party could communicate directly with the closest taxi driver and thus eliminating the need for the Service Provider switchboard.

The published international patent application WO 96/27997 describes a subscriber service for establishing a connection between an A-subscriber (originating party) and a B-subscriber (terminating party) in a telecommunication network. The A-subscriber wishes to be connected to any B-subscriber located in a given geographical area and enters a subscriber service code which is received by a switching station in the network. The service code comprises information identifying the geographical area and the network localizes B-subscribers that are available in the area and selects at least one B-subscriber. Finally, the connection is established between the A-subscriber and the selected B-subscriber.

U.S. Pat. No. 5,235,633 describes a cellular telephone system in which call management, including selection of a cell site most appropriate for a call associated with a mobile unit, are made based on the geographic location of a mobile unit rather than on the strength of the signal associated with the call. The mobile unit includes a GPS receiver that receives information from a geostationary satellite to determine the precise location of the mobile unit. This position information is relayed to the cell site initially managing the mobile unit, and the mobile unit is handed off to a cell site that is most appropriate for the call. Apart from using the position information for making handoff decisions, U.S. Pat. No. 5,235,633 describes briefly that this information can be used to assess call charges, to collect usage and traffic pattern data and in connection with emergencies.

In e.g. the freephone service, the routing of a telephone call can be made dependent on the A-number of a calling party (so called location dependent or originating dependent routing). When the freephone services is invoked by dialling a freephone B-number, the dialled B-number is translated by the network into a C-number and the call is set up between the calling party and the destination party associated with the C-number. In many countries, e.g. Sweden, phone numbers are defined such that the most significant bits of a phone number comprises an area code corresponding to a geographical area. A typical way of setting up a freephone service is to translate the dialled B-number into a C-number having the same area code as the A-number. Thus the calling party and the destination party can be arranged to both be located in the geographical area corresponding to the area code. However, routing a telephone call based on the area code of the calling party does not enable the network to select the closest one among a set of parties all having phone numbers with an identical area code.

To enable a phone call to be routed e.g. to the nearest branch of Pizza Hut when there are several branches having phone numbers with the same area code, a more elaborated version of originating dependent routing has been used, wherein a street address of the calling subscriber is determined from the A-number by interrogating a database storing addresses of each phone subscriber. The street address of the calling subscriber is then used to determine which branch should handle the call and the call is routed accordingly.

However, if either the calling party or the set of parties from which the terminating party is to be selected are using mobile phones, it is not possible to route a call to the nearest party based on the phone numbers of said parties.

In the IS-41 standard, a service called Mobile Access Hunting (MAH) is described. The MAH-service causes a call to a Pilot Directory Number to search a list of MAH-group members, i.e. mobile stations associated with the Pilot Directory Number, sequentially for one that is idle and able to be alerted. If a particular MAH-group member is busy, inactive, fails to respond to a paging request, or does not answer alerting before a time-out, then the next MAH-group member in the list is tried.

SUMMARY OF THE INVENTION

A communication network comprises a radio communication network in which a group of mobile communicating units is operating, the group of mobile communication units being associated with a common group address. The invention solves the problem of establishing communication between an originating party and a most suitable party in said group.

The problem is solved essentially by a method in which the geographical positions of the originating party and the mobile communication units in said group are determined, one of the mobile communication units is selected based on the determined geographical positions and communication is established between the originating party and the selected mobile communication unit. The solution includes a communication network with the necessary means for performing the method.

More specifically, the problem is solved in the following manner. The communication network receives a request for communication between the originating party and a terminating party. The terminating party address specified in the request, corresponds to the common group address. The geographical positions of the originating party and at least a subset of the mobile communication units in said group are determined. Based on the determined geographical positions, one of the mobile communication units in said group is selected. Communication is established between the originating party and the selected mobile communication unit.

Thus, one object of the invention is to enable a communication network to offer a communication service, whereby communication can be established between an originating party and a terminating party, wherein the terminating party is selected from a set of mobile communication units as the mobile communication unit that is most suitable considering the geographical positions of the originating party and the mobile communication units.

A communication service of the aforesaid kind affords a number of advantages when offering geographically dependent services such as taxi, package delivery, handling of burglar alarms etc. By using the inventive communication service, the need for a staffed service switchboard or liasion-central is eliminated. Thus the service can be offered with shorter response time, better precision and at a lower cost.

The invention will now be described in more detail with reference to exemplifying embodiments thereof and also with reference to the accompanying drawings.

DETAILED DESCRIPTION OF THE EMBODIMENTS

Figure 1:
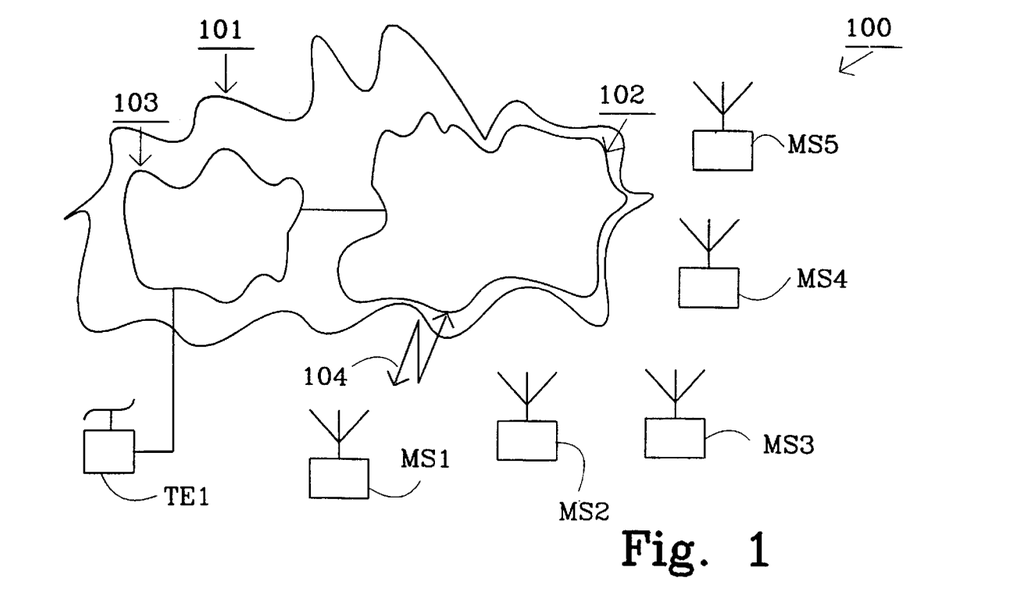
FIG. 1 illustrates a schematic view of a communication system comprising a communication network.

FIG. 1 illustrates a schematic view of a communication system 100 comprising a telephone TE1, a number of mobile communication units MS1–MS5 and a communication network 101 in which the inventive communication service is implemented. The communication network 101 comprises a radio communication network 102 in which the mobile communication units MS1–MS5 are operating. Communication between the radio communication network 102 and the mobile communication units MS1–MS5 occurs via transmission of and reception of radio signals 104. The mobile communication units MS2–MS5 comprises a group of mobile communication units which are all associated with a common group address. Communication networks in which the inventive communication service is implemented may comprise other networks in addition to a radio communication network and thus in the examplifying communication network 101 of FIG. 1, a telephone network 103 providing fixed telephony service is depicted. The telephone TE1 is connected to the telephone network, and enables a residential telephone subscriber to communicate by making and receiving telephone calls.

An originating party may invoke the inventive communication service by requesting the communication network to establish communication between the originating party and a terminating party whose address corresponds to the common group address. The terminating party address specified in the request may be identical to the common group address, but it may also be another address that is translated by the communication network into the common group address.

The originating party may be another mobile communication unit operating in the radio communication network 102, such as the mobile communication unit MS1. However the originating party does not have to be a mobile communication unit operating in the radio communication network 102, but may instead be e.g. the residential telephone subscriber making a phone call via the telephone TE1.

Figure 2A:
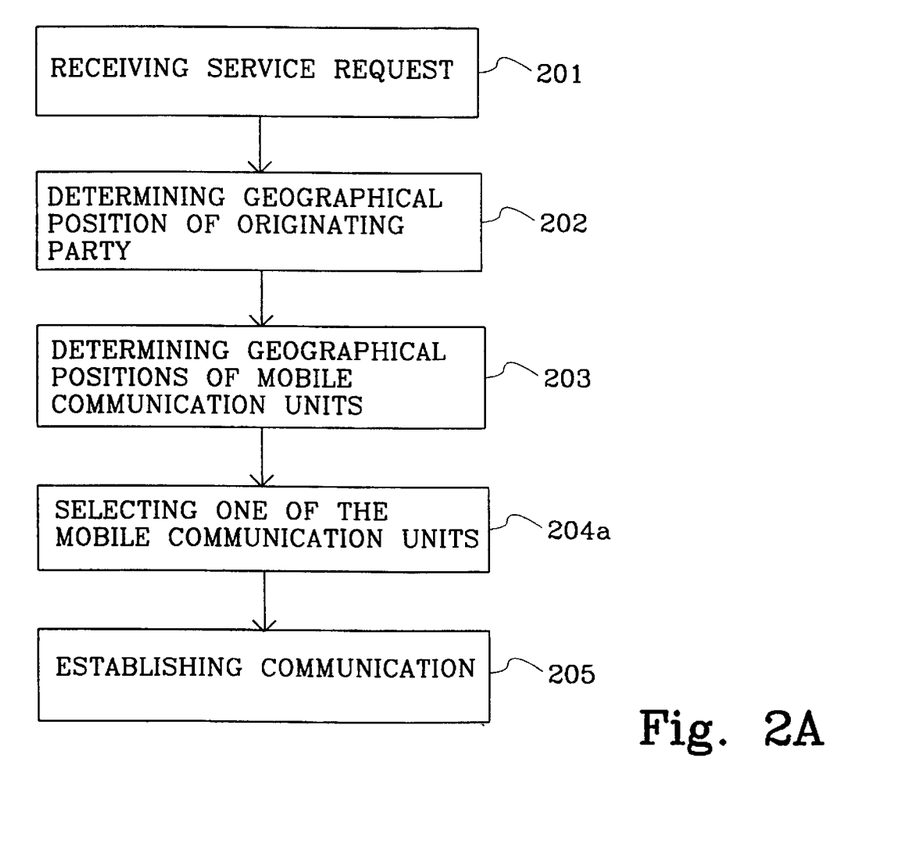
FIGS. 2A–2B are flowsheets illustrating two different methods for performing the inventive communication service.

FIG. 2A is a flowsheet illustrating method steps carried out in the communication network 101 depicted in FIG. 1 when performing the inventive service. This set of method steps comprises a first embodiment of the inventive method.

At step 201, the request for communication between the originating party and the terminating party is received by the communication network 101.

At step 202, the communication network 101 determines the geographical position of the originating party.

At step 203, the communication network 101 determines the geographical positions of at least a subset of the mobile communication units MS2–MS5 associated with the common group address.

At step 204a, the communication network 101 selects one of the mobile communication units MS2–MS5 associated with the common group address. The selection is made in dependence of the geographical positions of the originating party and said subset of the mobile communication units MS2–MS5 associated with the common group address. Typically, the communication service is set up so that the mobile communication unit that is determined as being closest to the originating party is selected.

Finally, at step 205 the communication network 101 establishes communication between the originating party and the selected mobile communication unit. In many situations, such as when the communication service is invoked due to the originating party making a phone call, step 205 comprises establishing a connection between the originating party and the selected mobile communication unit. However, there are also situations where connectionless communication may occur between the originating party and the selected mobile communication unit. One example where connectionless communication occurs would be when the originating party and the mobile communication units are operating in a cellular network supporting a short message service (SMS) and the originating party makes use of this short message service, i.e. sends a SMS-message, when invoking the inventive communication service.

Referring back to step 203, the communication network 101 may decided to not determine the geographical position of a mobile communication unit associated with the common group address, if the communication network already at step 203 can determine that the mobile communication unit will not be selected at step 204a. This may e.g. be due to the mobile communication unit having notified the communication network that it is temporarily not available for selection.

Referring back to steps 203 and 204a, one way for the communication network 101 to perform step 203 would be to continuously register information on the geographical positions of the mobile communication units MS2–MS5 associated with the common group address and then, when selecting the mobile communication unit at step 204a, use this registered information in the selection process. A second way of performing step 203 would be to trigger measurement of the geographical positions of the mobile communication units MS2–MS5 associated with the common group address subsequent to receiving a request invoking the inventive communication service, and then use this freshly measured information when selecting the mobile communication unit at step 204a.

The first approach has the advantage of enabling faster communication establishment between the originating party and the selected mobile communication unit. This is a very important advantage when establishing e.g. a phone call and there are many mobile communication units associated with the common group address. On the other hand, the second approach has the advantage of eliminating the need of continuously registering, in the communication network 101, the geographical positions of the mobile communication units MS2–MS5 associated with the common group address and thus potentially reduces overhead load in the communication network 101. This may be an advantage in situations where the communication service is invoked rather infrequently and where the time needed to establish communication between the originating party and the selected party is not critical, e.g. when transferring a SMS-message.

Figure 2B:
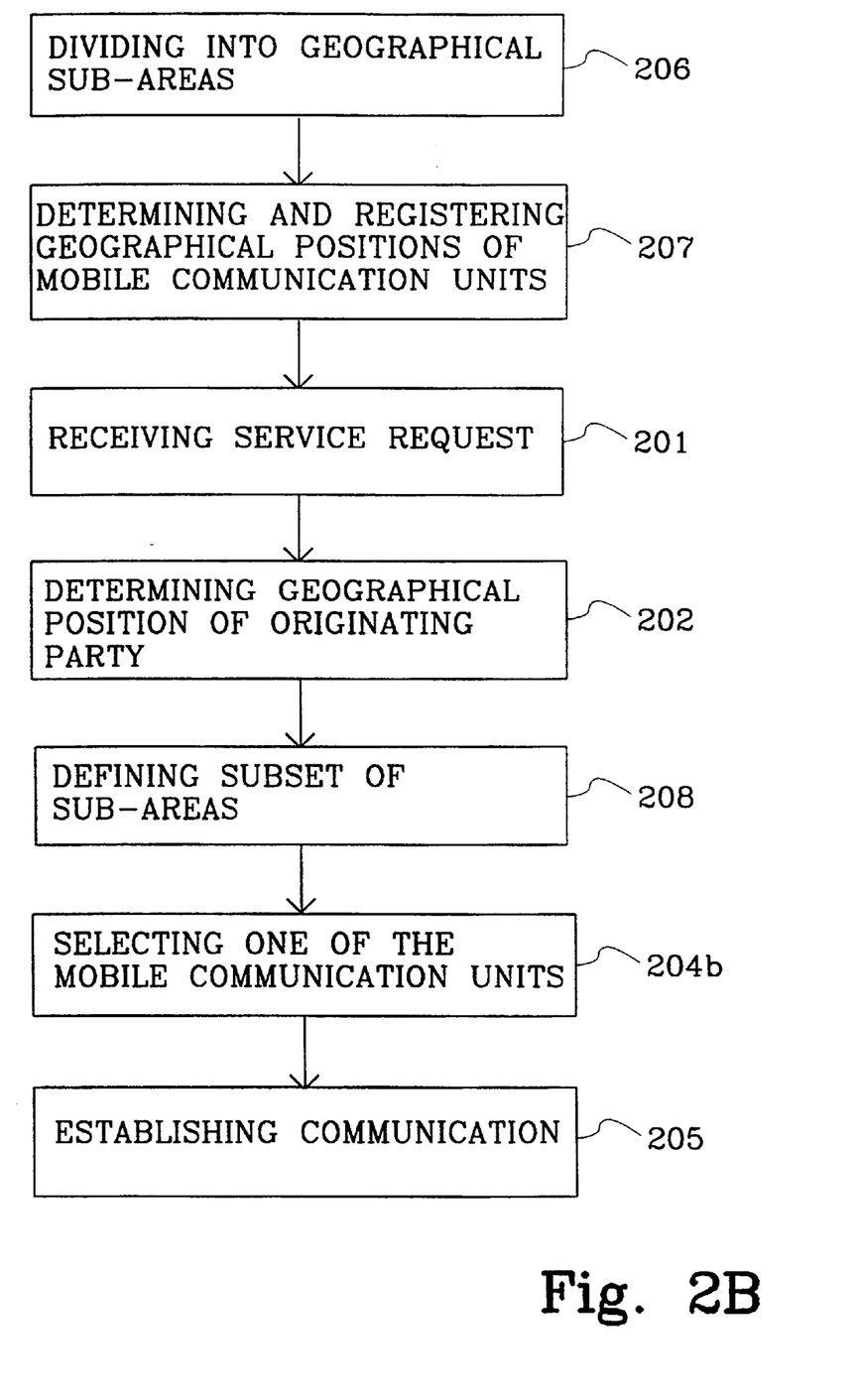

FIG. 2B is a flowsheet illustrating an alternative set of method steps carried out in the communication network 101 depicted in FIG. 1 when performing the inventive service. This alternative set of method steps comprises a second embodiment of the inventive method.

At step 206, a geographical area, in which the mobile communication units MS2–MS5 associated with the common group address are operating, is divided into geographical sub-areas.

At step 207, the communication network 101 determines and registers information on the geographical positions of the mobile communication units MS2–MS5 associated with the common group address. The communication network 101 also registers, for each sub-area, information on which of the mobile communication units MS2–MS5 are currently located in that sub-area. Step 207 is being performed continuously so that the communication network 101 is continuously being updated on the geographical positions of the mobile communication units MS2–MS5 associated with the common group address.

Steps 201 and 202 in FIG. 2B are identical with steps 201 and 202 in FIG. 2A, i.e. the communication network 101 receives the request for communication between the originating party and the terminating party and the communication network 101 determines the geographical position of the originating party.

At step 208 in FIG. 2B, the communication network 101 defines a subset of the sub-areas based on the geographical position of the originating party. One way of defining the subset could e.g. be to define it as comprising the sub-area in which the originating party is located and the immediately surrounding sub-areas. If no mobile communication unit is registered as currently being in one of these sub-areas, the subset could be extended to include further sub-areas.

Step 204b in FIG. 2B differs from step 204a in FIG. 2A in that at step 204b, only those mobile communication units registered as currently being in a sub-area belonging to said subset defined at step 208 are considered when at step 204b selecting one of said mobile communication units.

Finally at step 205, which is identical with step 205 in FIG. 2A, the communication network 101 establishes communication between the originating party and the selected mobile communication unit.

One advantage of the inventive method illustrated in FIG. 2B is that the amount of processing required when the communication service is invoked can be reduced as compared to the inventive method illustrated in FIG. 2A. This may be an important advantage in situations where there are many mobile communication units associated with the common group address, and the inventive communication service is frequently invoked.

Below follows a more detailed example of how the inventive method illustrated in FIG. 2B may be implemented.

Figure 3:
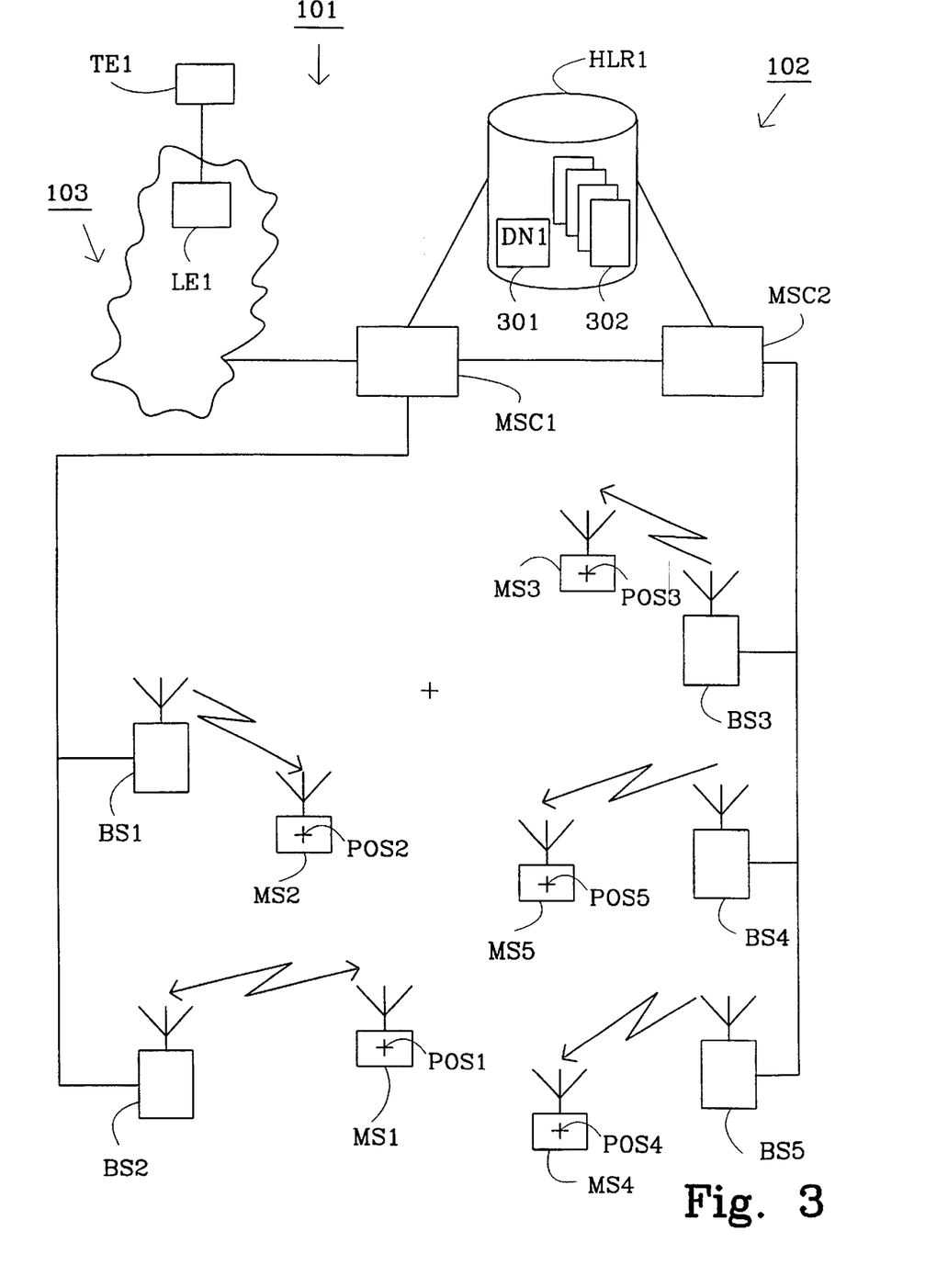
FIG. 3 illustrates a more detailed view of the communication network introduced in FIG. 1.

FIG. 3 illustrates more details of the communication network 101 introduced in FIG. 1. The radio communication network 102 illustrated in FIG. 3 is in the form of a cellular network having a network structure conforming to the IS-41 standard. Note that the invention is in no way limited to be applied only in IS-41 conformant cellular networks, but may on the contrary be applied in many different kinds of radio communication networks such as GSM, PDC, NMT, TACS etc. The cellular network 102 comprises a home location register (HLR) HLR1. The cellular network 102 further comprises a first mobile switching center (MSC) MSC1 and a second mobile switching center MSC2. Both mobile switching centers MSC1, MSC2 depicted in FIG. 3 are assumed to include visitor location registration (VLR) functionality, i.e. the nodes MSC1 and MSC2 comprises both the Mobile Switching Center and the Visitor Location Register functional entities defined in IS-41. A first set of base stations BS1–BS2 are connected to the first mobile switching center MSC1 and provides radio coverage in a geographical area served by the first mobile switching center MSC1. A second set of base stations BS3–BS5 are connected to the second mobile switching center MSC2 and provides radio coverage in a geographical area served by the second mobile switching center MSC2. The first mobile switching center acts as a gateway mobile switching center (GMSC) and interconnects the cellular network 102 with the telephone network 103. The telephone network 103 comprises a local exchange LE1. Since the network elements described above all are well known to a person skilled in the art, the general function of each of these network elements will not be elaborated upon any further.

The mobile communication units, which will be referred to interchangeably as mobile stations, MS1–MS5 introduced in FIG. 1 are operating in the cellular network 102 depicted in FIG. 3. The telephone TE1 introduced in FIG. 1 is connected to the local exchange LE1, where subscription information relating to the residential telephone subscriber is stored.

The inventive communication service is, in this example, implemented in the cellular network 102 based on the Mobile Access Hunting (MAH) service described in the IS-41 standard. The Mobile Access Hunting (MAH) service causes a call to a Pilot Directory Number, i.e. a common group address, to search a list of termination addresses sequentially for one that is idle and able to be alerted. If a particular termination address is busy, inactive, fails to respond to a paging request, or does not answer alerting before a time-out, then the next termination address in the list is tried. The members of an MAH group, i.e. the mobile stations that are associated with the common group address/Pilot Directory Number, are described by a list of termination addresses. Each termination address may either be a Directory Number or a Mobile Identification Number (MIN) that uniquely identifies a mobile station.

The inventive communication service implemented based on the standard MAH-service will be referred to as a Location dependent Mobile Access Hunting (LMAH) service, where each group of mobile stations MS2–MS5 associated with a common group address/LMAH Pilot Directory Number DN1 is referred to as a LMAH-group in which each individual mobile station is referred to as a LMAH-group member.

The principal difference between the MAH-service defined in the IS-41 standard and the inventive LMAH-service is that in the inventive LMAH-service, when a call to the LMAH Pilot Directory Number DN1 is received, a LMAH-group member is selected to handle the call based on the geographical positions of the originating party and the LMAH-group members MS2–MS5. To enable this geographically based selection, the cellular network 102 continuously registers the geographical positions POS2–POS5 of the mobile communication units MS2–MS5 in the LMAH-group. When a call to a LMAH Pilot Directory Number DN1 is received, the geographical position of the originating party is determined which, together with the previously registered geographical positions POS2–POS5 of the LMAH-group members MS2–MS5, is used in the selection process.

In this examplifying embodiment of the invention, the LMAH-group must be defined in the home location register HLRL before any calls can be made to the LMAH Pilot Directory Number DN1. Thus the home location register HLR1, stores a LMAH-group record 301 for each LMAH-group defined in the home location register HLR1. The LMAH-group record 301 comprises:

the LMAH Pilot Directory Number DN1;

a list of LMAH-group members, each member represented in the list with its Mobile Identification Number (MIN);

a data structure, defining how the geographical area in which the LMAH-group members are operating is divided into sub-areas. The data structure comprises a set of records where each record defines one sub-area and comprises a sub-area identity, geographical coordinates defining the sub area and a list of LMAH-group members currently located in that sub area.

a position updating interval, defining how often the LMAH-group member positions are to be updated.

In addition to the data stored in the LMAH-group record 301, the HLR also stores for each LMAH-group member information related to the LMAH-service. This information is stored in a mobile subscriber record 302 and comprises:

the geographical position of the mobile station in the form of latitude and logitude;

a status flag indicating whether the LMAH-group member is an active or inactive LMAH-group member, i.e. whether the LMAH-group member is ready to handle calls to the LMAH-group or not;

the LMAH-group identity (LMAH Pilot Directory Number DN1).

Note that the mobile subscriber record 302 also stores other information relating to other services than the LMAH-service.

Once the LMAH-group has been defined in the home location register HLR1, the cellular network 102 begins the process of continuously registering the geographical positions POS2–POS5 of the LMAH-group members MS2–MS5.

Figure 4:
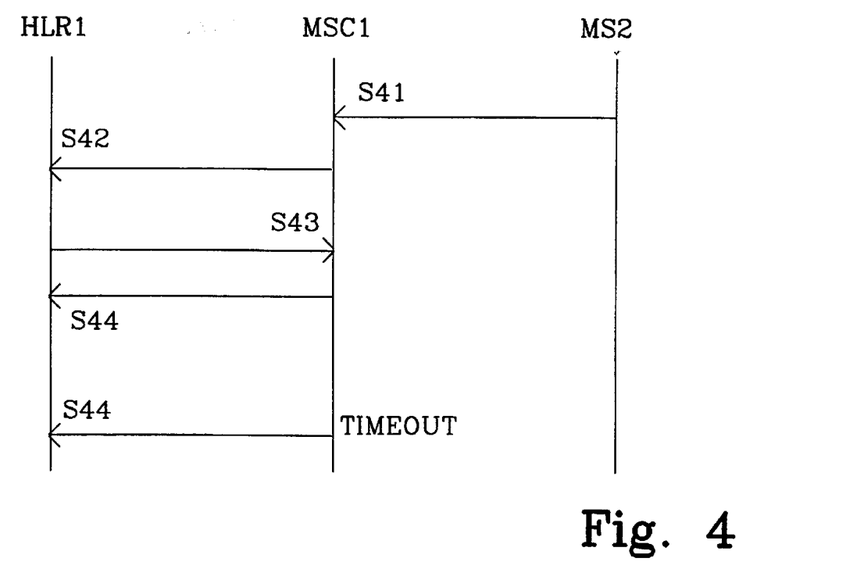
FIG. 4 and FIG. 5 are signalling diagrams illustrating signalling sequence when performing the inventive communication service in the communication network illustrated in FIG. 3.

FIG. 4 is a signalling diagram illustrating how the cellular network 102 depicted in FIG. 3 continuously registers the geographical position of a LMAH-group member. In,this example scenario it is assumed that the mobile station MS2 enters the geographical area served by the first mobile switching center MSC1. The mobile station MS2 initiates a register access procedure and sends a signal S41, comprising the identity of the mobile station MS2, via a base station BS1 to the first mobile switching center MSC1.

The first mobile switching center MSC1 recognises that a roaming mobile station has entered its service area and sends a Registration Notification operation signal S42 to the home location register HLR1, in which subscriber data for the mobile station MS2 is held. The home location register HLR1 notes that the mobile station MS2 is now located in the area controlled by the first mobile switching center MSC1 and returns a Registration Notification response signal S43 to the mobile switcing center. The Registration Notification response signal S43 comprises data related to the mobile station MS2, including the LMAH Pilot Directory Number DN1, the position updating interval for the LMAH-group and the status flag indicating whether the mobile station MS2 is an active or inactive LMAH-group member. The first mobile switching center MSC1 recognises from the data received from the home location register HLR1 that the mobile station MS2 is a LMAH-group member and that it needs to determine the geographical position POS2 of the mobile station MS2 and report the geographical position POS2 to the home location register HLR1.

There are numerous different known methods and arrangements for determining the geographical position of a mobile station which can be used in connection with the present invention. Two examples of such methods and arrangements can be found in the published international patent applications WO 96/31076 and WO 97/30360. Since these kinds of methods and arrangements are well known to a person skilled in the art, the details on how to determine the geographical position of a mobile station will not be elaborated upon any further.

The mobile swiching center MSC1 determines the geographical position POS2 of the mobile station MS2 and sends a Position Update operation signal S44 to the home location register HLR1. The Position Update operation signal S44 comprises the identity of the mobile station MS2 (MIN) and the geographical position POS2. The home location register HLRL stores the geographical position POS2 for the mobile station MS2 and also determines, using the geographical position POS2 of the mobile station MS2 and the data structure defining sub-areas for the LMAH-group, in which sub-area the mobile station MS2 is currently located. The mobile station MS2 is entered on the list of LMAH-group members located in the determined sub-area.

After sending the Position Update operation signal S44, the mobile switching center MSC1 sets a timer according to the position updating interval data received in the Registration Notification response signal S43. Upon time out, the first mobile switching center MSC1 once more determines the geographical position POS2 of the mobile station MS2, reports the position to the home location register HLRL in a new Position Update operation signal S44, and sets the timer anew. This process is repeated as long as the mobile station MS2 remains active and ready to handle calls to the LMAH-group within the service area of the first mobile switching center MSC1.

In addition to continuously updating the home location register HLR1 with information on the geographical position of the LMAH-group members, the LMAH-service enables the LMAH-group members to specify whether they are ready to handle calls to the LMAH-group or not, i.e. whether the LMAH-group member is an active or inactive LMAH-group member. This feature of the LMAH-service is very similar to the MAH membership activation and deactivation feature of the MAH-service described in the IS-41 standard and will thus not be described in more detail. One important remark though is that if the LMAH-group member MS2 changes status from active to inactive while operating in the service area of the first mobile switching center MSC1, the MSC1 will be notified by the home location register HLR1 of this status change and the mobile switching center MSC1 will not determine and report the geographical position POS2 of the mobile station MS2 until it is notified by the home location register HLRL that the status has been returned to active.

Figure 5:
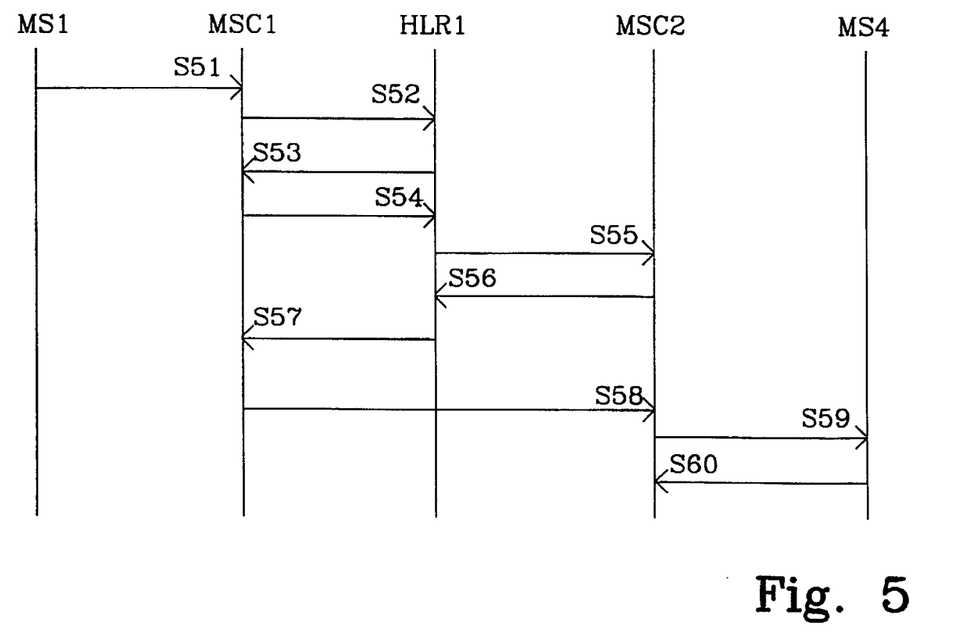

FIG. 5 is a signalling diagram illustrating how the cellular network 102 depicted in FIG. 3 handles an incoming call to the LMAH Pilot Directory Number DN1. In this example scenario it is assumed that the call is initiated by the mobile station MS1 which is located in the geographical area served by the first mobile switching center MSC1.

The mobile station MS1 initiates the call by sending a call setup signal S51 to the first mobile switching center MSC1. The call setup signal S51 comprises the LMAH-group Directory Number DN1 as a called party number. The mobile switching center MSC1, after analyzing the received called party number, sends a Location Request operation signal S52 to the home location register HLR1. The Location Request operation signal S52 comprises the called party number and a call identity e.g. in the form of a so called Billing ID. The home location register HLR1 recognizes the called number as an LMAH Pilot Directory Number and sends a Geographical Position Request operation signal S53 to the first mobile switching center MSC1. The Geographical Position Request operation S53 comprises the call identity received in the Location Request operation signal S52. The mobile switching center MSC1 determines the geographical position POS1 of the calling mobile station MS1. One example of a method that could be used to determine the geographical position is the method described in WO 96/31076 but there are numerous other methods that could be used as well. After determining the geographical position of the mobile station MS1, the mobile switching center returns a Geographical Position Request response signal S54 to the home location register HLR1. The Geographical Position Request response signal S54 comprises the geographical position of the mobile station MS1.

The next step in the process is for the home location register HLR1 to select a LMAH-group member to handle the call.

Figure 6:
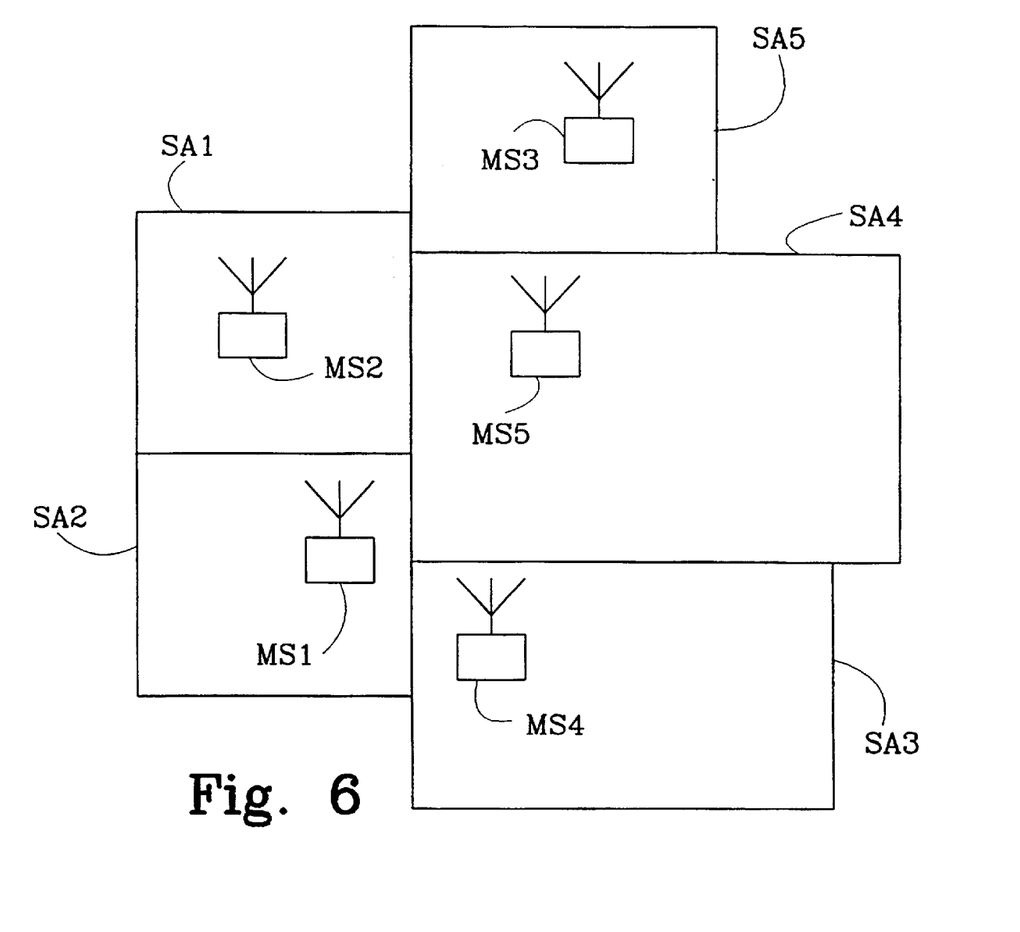
FIG. 6 is a view illustrating mobile stations located in different geographical sub-areas.

FIG. 6 is a schematic view illustrating how the mobile stations MS1–MS5 are located in different sub-areas SA1–SA5. The sub-areas may for example be defined as rectangles of different sizes as illustrated in FIG. 6. Each rectangular sub-area can be defined by providing the geographical coordinates (longitude and latitude) of two, non adjacent, corners. An alternative way of defining each sub-area would be to provide longitude and latitude intervals, i.e. minimal and maximal values of both longitude and latitude. Thus, the data structure defining the sub-areas for the LMAH-group comprises, for each sub-area, one of the above described two sets of parameters defining the sub-area.

As illustrated in FIG. 6, the originating party, i.e. the mobile station MS1, is located in sub-area SA2. In this examplifying embodiment of the invention, the home location register HLR1 defines a subset of the sub-areas comprising the sub-area in which the originating party MS1 is located and the immediate surrounding sub-areas, i.e. the subset comprises sub-areas SA1–SA4. Since there are LMAH-group members within this sub-area subset, the home location register HLR1 will only consider LMAH-group members located within these sub-areas as candidates for handling the call. The home location register HLR1 examines the status of each of the LMAH-group members in sub-areas SA1–SA4 and determines for those LMAH-group members that are active, the distance to the originating party MS1. The home location register HLR1 creates a temporary list in which these LMAH-group members are sorted according to the distance between the originating party MS1 and each LMAH-group member. The home location register HLR1 selects the LMAH-group member that is closest to the originating party MS1, i.e. mobile station MS4, as the primary candidate for handling the call.

Referring once again to FIG. 5, since the mobile station MS4 is located in the service area of the second mobile switching exchange MSC2, the home location register HLR1 requests routing information from the second mobile switching center MSC2 by sending a Routing Request operation signal S55 to the mobile switching center MSC2. The mobile switching center MSC2 checks its internal data structures and determines that the mobile station MS4 is currently idle. The mobile switching center allocates a first Temporary Local Directory Number (TLDN) and returns this TLDN in a Routing Request response signal S56. The home location register HLR1 forwards the received TLDN to the first mobile switching center MSC1 in a Location Request result signal S57. The first mobile switching center MSC1 attempts to establish the call to the received TLDN and sends a call setup signal S58 to the second mobile switching center MSC2. The call setup signal S58 comprises the TLDN as destination address. When the second mobile switching center MSC2 receives the setup signal S58, it sends a page signal S59 to the mobile station MS4. The mobile station MS4 responds to the page signal by returning a page response signal S60, and when the person using the mobile station MS4 answers, the call is set up, i.e. a connection is established between the originating party MS1 and the LMAH-group member MS4.

The home location register HLR1 retains the temporary list of candidates for handling the call for a certain time period. Thus, if the call was not successfully established to the selected LMAH-group member MS4, the first mobile switching center MSC1 can request an alternative candidate from the home location register HLR1 by using the Transfer To Number Request operation, in which case the home location register HLR1 determines and returns routing information for one of the other candidates on the temporary list, i.e. the LMAH-group member that was determined as being second closest to the originating party MS1.

In another example scenario for how an incoming call to the LMAH Pilot Directory Number DN1 is handled it is assumed that the call is initiated by the residential telephone subscriber via his telephone TE1. In this scenario the call is routed through the telephone network 103 in FIG. 3 and reaches the first mobile switching center MSC1 which is acting as an gateway mobile switching center. As in the previous scenario illustrated in FIG. 5, the mobile switching center MSC1 sends a Location Request operation signal to the home location register HLR1 which responds by sending a Geographical Position Request operation signal to the mobile switching center MSC1. At this point the mobile switching center MSC1 needs to determine the geographical position of the originating party, i.e. the residential telephone subscriber.

One approach to determine the geographical position of the originating party in this scenario is to provide the mobile switching center MSC1 with access to a database, where the geographical positions of subscribers in the telephone network 103 are registered. By interrogating the database, using the phone number of the originating party, i.e. the so called A-number, the mobile switching center MSC1 can determine the geographical position of the residential subscriber acting as the originating party in this scenario.

A second approach to determine the geographical position of the originating party in this scenario, is to modify the telephone network 103 so that in the local exchange LE1, the geographical position of endpoints of subscriber lines terminating in the local exchange LE1 are registered in the exchange LE1. The telephone network 103 is further provided with means for transferring the geographical position of the subscriber line end point to which the originating party is attached, through the telephone network 103 to the first mobile switching center MSC1.

Once the geographical position of the originating party, i.e. the residential telephone subscriber, has been determined the remainder of the call establishment is handled in the same way as described in the previous scenario illustrated in FIG. 5.

If a situation were to arise where the communication network 101 is unable to automatically establish the geographical position of a originating party, there are several different ways of handling the call.

One alternative would be to determine the position of the originating party semi-automatically using so called voice prompting, whereby the originating party is prompted to specify his geographical position with an appropriate level of precision.

A second alternative would be to implement a communication service which provides a mix of the inventive LMAH-service and the MAH-service described in the IS-41 standard. In this alternative, all calls where the geographical position of the originating party can be established are handled according to the inventive LMAH-service described above. Calls in which the geographical position of the originating party can not be established are handled according to the MAH-service described in the IS-41 standard.

A third alternative would be to route the call to a telephone operator.

A fourth alternative would be to divert the call to an answering machine providing an appropriate message.

Figure 7A:
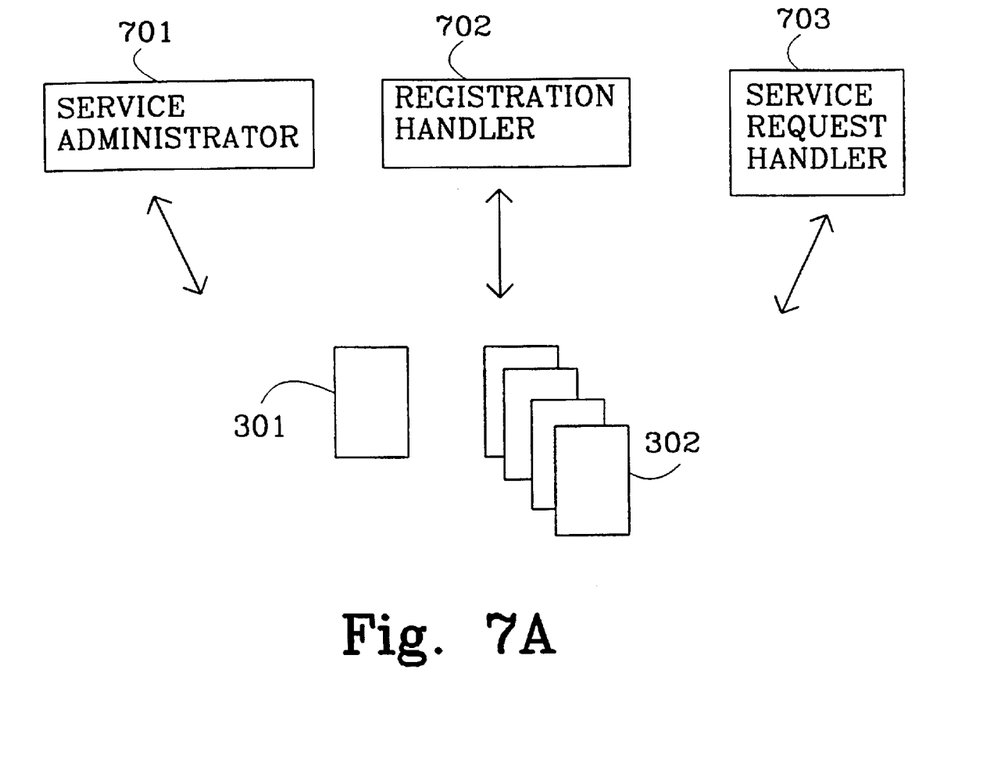
FIGS. 7A–7B are block diagrams illustrating function blocks in a home location register and a mobile switching center respectively.

FIG. 7A is a block diagram illustrating function blocks related to the LMAH-service in the home location register HLR1 in FIG. 3. These function blocks comprise a service administrator 701, a registration handler 702 and a service request handler 703.

The function block service administrator 701 enables a network operator to create, modify and delete LMAH-groups. Typically these kind of actions are performed in response to requests from LMAH-service subscribers such as e.g. a taxi company. As an example, a LMAH-service subscriber may request that additional mobile stations are added as LMHA-group members or that existing LMHA-group members are deleted from the LMAH-group.

The function block registration handler 702 performs all activities in the home location register HLR1 relating to registration of LMHA-group member positions and status. Thus the registration handler 702 functions as a position registration means for continuously registering the geographical positions of the LMAH-group members and which LMAH-group members are located in each sub-area. The registration handler 702 also functions as an association handling means for registering, upon request by a LMAH-group member whether that member is an active or an inactive group member, i.e. whether or not the group member may be selected to handle a call to the LMAH-group.

The function block service request handler 703 performs all activities in the home location register HLR1 relating to calls to LMHA-groups. Thus the service request handler 703 functions as a request receiving means for receiving a call request from an originating party to a LMAH-group, as a defining means for defining a subset of sub-areas, based on the geographical position of an originating party, and as a selecting means for selecting a LMAH-group member located in a sub-area in said subset to handle the call.

The function blocks 701–703 all operate on the data stored in the LMAH-group record 301 and the mobile subscriber records 302 of the LMAH-group members.

Figure 7B:
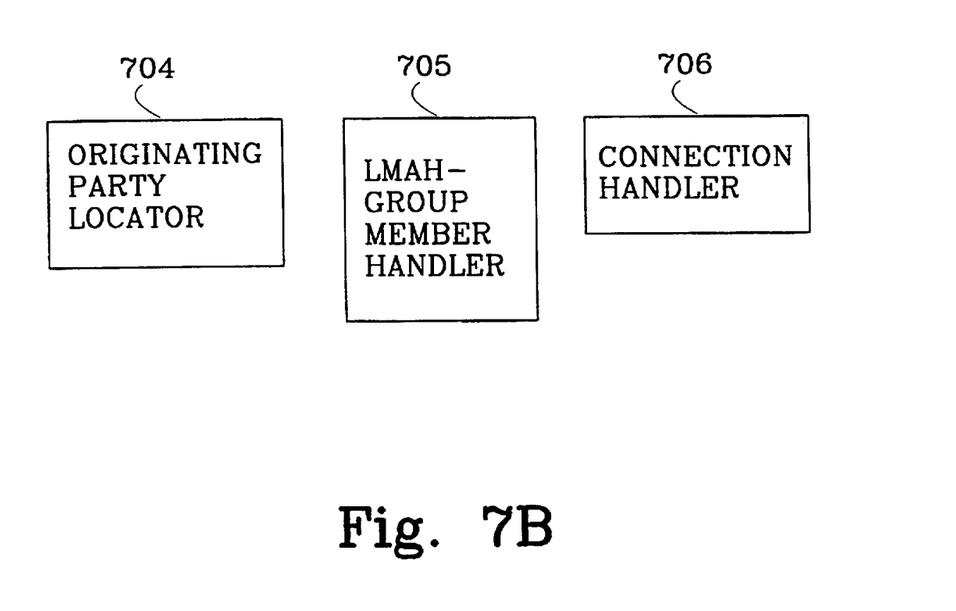

FIG. 7B is a block diagram illustrating function blocks in each of the mobile switching centers MSC1–MSC2 in FIG. 3. These function blocks comprise an originating party locator 704, a LMHA-group member handler 705 and a connection handler 706.

The originating party locator 704 functions as a first position determining means for determining a geographical position of an originating party upon request by the home location register HLR1.

The LMHA-group member handler 705 functions as a second position determining means for continuously determining the geographical positions of LMHA-group members.

The connection handler 706 functions as part of a communication means for establishing communication between an originating party and a LMHA-group member by establishing a connection between the originating party and a selected LMHA-group member.

There are several different ways the communication network 101 could be modified to provide different embodiments of the inventive communication service. A few of these modifications is are described below.

The feature enabling LMAH-group members to specify whether they are active or inactive is of course optional. The feature could be controlled by subscription parameters stored in the home location register HLR1 which specifies for each LMAH-group member whether that member is allowed to go inactive or should remain active all the time.

Instead of registering status information indicating whether a LMAH-group member is available or not available for selection when a call to the LMAH Pilot Directory Number is received, this feature could be implemented by enabling the LMAH-group member to become disassociated/reassociated with the LMAH Pilot Directory Number upon request from the LMAH-group member. After the LMAH-group member has made a first request to become disassociated with the LMAH Pilot Directory Number, the mobile station is no longer considered as a LMAH-group member. When the mobile station makes a second request to become reassociated with the LMAH Pilot Directory Number it is once more considered as a LMAH-group member.

Dividing the geographical area in which the LMAH-group members are operating into sub-areas and registering which LMAH-group members are located in each sub-area is optional. It is primarily when there are many LMAH-group members and the LMAH-group is called frequently, that this feature may be useful. Thus, it could be decided when defining a LMAH-group in the home location register HLR1, whether the LMAH-group should use this feature or not. Note also that there are other options for how sub-areas can be defined apart from the examples illustrated in FIG. 6. Sub-areas using different geometrical shapes can be defined by defining the geographical coordinates of more than two points on each sub-area boundary. It is advantageously if the sub-areas can be defined so that the LMAH-group members are evenly distributed among the sub-areas.

An alternative to continuously register the geographical positions POS2–POS5 of the LMHA-group members MS2–MS5 in the cellular network 102, would be to trigger measurement of the geographical positions POS2–POS5 of the LMHA-group members MS2–MS5 when a call to the LMHA Pilot Directory Number DN1 is received and use this freshly measured information when selecting a LMHA-group member to handle the call. According to this alternative, the example scenario previously described in connection with FIG. 5 can be modified as follows. In addition to sending the Geographical Position Request operation signal S53 to the first mobile switching center MSC1, the home location register HLR1 also requests both mobile switching centers MSC1–MSC2 to determine the geographical positions of the LMAH-group members MS2–MS5. The home location register HLR1 then awaits reports on the geographical positions of the originating party and the LMAH-group members before selecting a LMHA-group member to handle the call. According to this alternative, the mobile switching centers MSC1–MSC2 do not have to distinguish between ordinary mobile stations and LMAH-group members, and thus do not have to implement the special functions related to LMAH-group members discussed in connection with FIG. 4.

There are several different alternative ways in how the cellular network 102 in FIG. 3 may implement the function of continuously registering the geographical positions of the LMAH-group members.

The mobile switching centers MSC1–MSC2 could offer a screening function, whereby the geographical position of a LMAH-group member is only reported to the home location register HLR1 if the LMAH-group member has moved a distance exceeding a certain threshold parameter since the last report was sent to the home location register HLR1. In this way the signalling load in the cellular network 102 could be reduced.

Another approach on how to track the LMAH-group members is to initiate each individual position determination event from the home location register HLR1. With this approach, the mobile switching centers MSC1–MSC2 do not have to distinguish between ordinary mobile stations and LMAH-group members, and do not have to implement the special functions related to LMAH-group members discussed in connection with FIG. 4.

Yet another approach on how to track the LMAH-group members would be to not continuously send Position Update operation signals from the mobile switching center MSC1–MSC2, but instead only register the geographical positions of the LMAH-group members in the mobile switching center MSC1–MSC2. When the home location register HLR1, in the course of handling a call, needs to know the geographical positions of the LMAH-group members, it would then interrogate the mobile switching centers MSC1–MSC2 for this information.

Thus, as illustrated above, there is great flexibility in terms of how to distribute functions among different nodes in the communication network.

Figure 8:
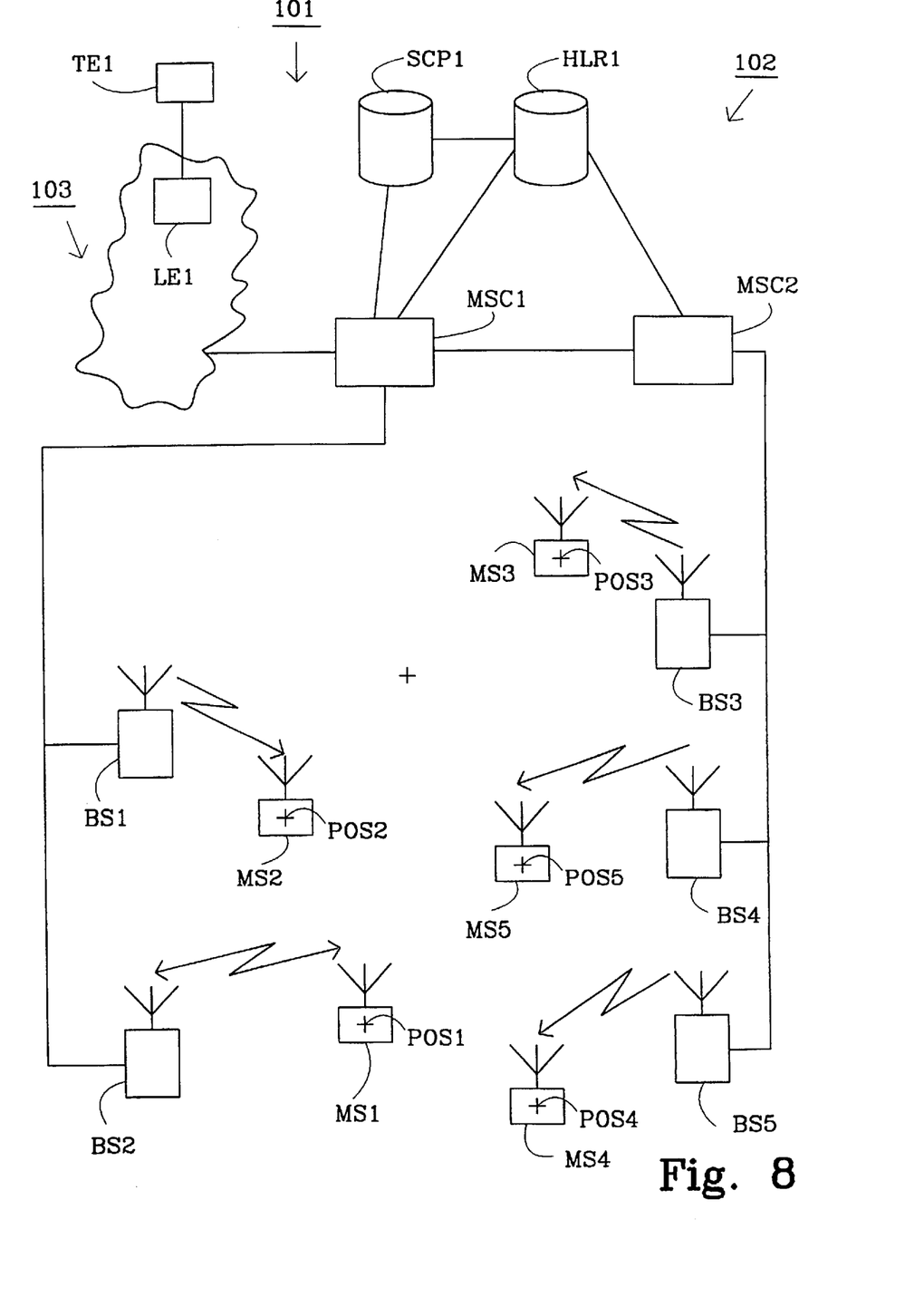
FIG. 8 is a view of a modified communication network comprising a service control point.

It is of course possible to implement the LMAH-service using network structures different from what is shown in FIG. 3. For example an intelligence network (IN) based network structure could be used. FIG. 8 illustrates one possible way of modifying the communication network 101 in FIG. 3 to an intelligent network. In FIG. 8, a service control point SCP1 has been added to the cellular communication network 102. In this modified cellular network 102, the mobile switching centers MSC1–MSC2 also acts as service switching points (SSP) interacting with the service control point SCP1. LMHA-group specific functions, as illustrated in FIG. 7A, are implemented in the service control point SCP1 instead of in the home location register HLR1. Incoming calls to a LMHA Pilot Directory number is routed to and handled by the service control point SCP1 instead of the home location register HLR1.

Instead of selecting the terminating party based on the distance to the originating party, as defined only by the longitude and latitude of both parties, the selection could be based on an estimate on how far the different LMAH-group members would actually have to travel in order to reach the originating party. This would be possible if the home location register HLR1 is provided with access to a database, comprising information on the road network in the area. The home location register HLR1 interrogates the database for the shortest road distance between the originating party and each of the LMAH-group members and selects a LMAH-group member which has a minimum road distance to travel in order to reach the calling party. Note that this is still a selection criteria based on the geographical positions of the originating party and the LMAH-group members.

It will be understood that the aforedescribed and illustrated embodiments are merely examples of the invention and that modifications and changes may be made within the scope of the following claims.

What is claimed is:

1. A method of performing a communication service in a radio communication network in which a group of at least two mobile communication units associated with a common group address is operating, the method comprising the steps of:

receiving a request for communication between an originating party and a terminating party whose address corresponds to the common group address;

determining a geographical position of the originating party;

continuously determining geographical positions of at least a subset of the mobile communication units and registering information on said geographical positions of the mobile communication units in the communication network;

dividing a geographical area in which the mobile communication units are operating into geographical sub-areas;

continuously registering in the communication network, for each sub-area, information on which of the mobile communication units are currently located in that sub-area;

defining a subset of the sub-areas based on the geographical position of the originating party;

selecting, from the mobile communication units registered as currently being in the subset of the sub-areas, one of the mobile communication units as the terminating party; and establishing communication between the originating party and the selected mobile communication unit.

2. A method according to claim 1 characterized in that step d) comprises selecting the mobile communication unit (MS4) that is determined as being closest to the originating party (MS1).

3. A method according to claim 1 characterized in that, upon request from one of said mobile communication units (MS2), the method further comprises the steps of:

j) disassociating the mobile communication unit (MS2) from the common group address (DN1);

k) reassociating the mobile communication unit (MS2) with the common group address (DN1).

4. A method according to claim 1 characterized in that, upon request from one of said mobile communication units (MS2), the method further comprises the steps of:

l) registering the mobile communication unit (MS2) as not available for selection at step d);

m) registering the mobile communication unit (MS2) as once more available for selection at step d).

5. A system for performing a communication service in a radio communication network in which a group of at least two mobile communication units associated with a common group address is operating, said system comprising:

means in the network for receiving a request for communication between an originating party and a terminating party whose address corresponds to the common group address;

means in the network for determining a geographical position of the originating party;

means in the network for continuously determining geographical positions of at least a subset of the mobile communication units and registering information on said geographical positions of the mobile communication units in a network database;

means in the network for dividing a geographical area in which the mobile communication units are operating into geographical sub-areas;

means for continuously registering in the network database, for each sub-area, information on which of the mobile communication units are currently located in that sub-area;

means in the network for defining a subset of the sub-areas based on the geographical position of the originating party;

means in the network for selecting, from the mobile communication units registered as currently being in the subset of the sub-areas, one of the mobile communication units as the terminating party; and means in the network for establishing communication between the originating party and the selected mobile communication unit.

6. The system according to claim 5 wherein the selecting means is adapted to select the mobile communication unit that is determined as being closest to the originating communication unit.

7. The system according to claim 5 further comprising association handling means in the network that disassociates an identified mobile communication unit from the common group address when the identified mobile communication unit is not available to receive a call, and reassociates the identified mobile communication unit with the common group address when the identified mobile communication unit is again available to receive a call.

8. The system according to claim 5 further comprising registration handling means that registers a requesting mobile communication unit as not available for selection when the requesting unit is not available to receive a call, and registers the requesting mobile communication unit as once more available for selection when the requesting unit is again available to receive a call, wherein the selecting means is adapted to not select the requesting mobile communication unit when the requesting mobile communication unit is registered as not available for selection.

* * * * *